(12) United States Patent
Breuer et al.

(10) Patent No.: US 8,550,143 B2
(45) Date of Patent: Oct. 8, 2013

(54) CURTAIN SUPPORT ASSEMBLY WITH INTEGRATED STORAGE FACILITY IN A CABIN OF A VEHICLE

(75) Inventors: Matthias Breuer, Hamburg (DE); Andreas Neumann, Wakendorf (DE); Michael Mosler, Hamburg (DE)

(73) Assignee: Airbus Operations GmbH (DE)

(*) Notice: Subject to any disclaimer, the term of this patent is extended or adjusted under 35 U.S.C. 154(b) by 214 days.

(21) Appl. No.: 12/409,876

(22) Filed: Mar. 24, 2009

(65) Prior Publication Data

US 2009/0242147 A1 Oct. 1, 2009

Related U.S. Application Data

(60) Provisional application No. 61/072,470, filed on Mar. 31, 2008.

(30) Foreign Application Priority Data

Mar. 31, 2008 (DE) .......................... 10 2008 016 420

(51) Int. Cl.
*E04F 10/00* (2006.01)
*E06B 9/00* (2006.01)
*A47G 5/02* (2006.01)
*B64D 11/00* (2006.01)
*B64D 13/00* (2006.01)

(52) U.S. Cl.
USPC ........ 160/323.1; 160/127; 160/38; 244/118.5

(58) Field of Classification Search
USPC .......... 160/323.1, 368.1, 127, 38; 244/118.5, 244/129.1, 129.4, 118.1, 121
See application file for complete search history.

(56) References Cited

U.S. PATENT DOCUMENTS

| 4,282,919 | A | * | 8/1981 | Teno ............................. 160/23.1 |
| 5,816,534 | A | | 10/1998 | Schumacher |
| 5,988,565 | A | * | 11/1999 | Thomas et al. ............ 244/118.1 |
| 6,062,147 | A | * | 5/2000 | Footitt et al. ..................... 108/60 |
| 6,241,186 | B1 | * | 6/2001 | Calnon ....................... 244/118.5 |
| 6,523,779 | B1 | * | 2/2003 | Michel ....................... 244/118.5 |

FOREIGN PATENT DOCUMENTS

| DE | 19526525 C1 | 2/1997 |
| DE | 202007013134 U1 | 12/2007 |

* cited by examiner

*Primary Examiner* — David Purol
*Assistant Examiner* — Jeremy Ramsey
(74) *Attorney, Agent, or Firm* — Lerner, David, Littenberg, Krumholz & Mentlik, LLP

(57) ABSTRACT

The invention relates to a curtain support assembly to receive a curtain rail for a curtain for separating at least two regions in a cabin of a vehicle, comprising two or more header components for covering a space formed between the curtain rail and a ceiling in the cabin. The assembly according to the invention distinguishes itself from the state of the art in that between the header elements, for the purpose of holding objects, a hollow space is formed that is accessible by way of one or several closable openings to the cabin. In a further improvement, a roller is integrated in the hollow space, by way of which roller the curtain may be rolled up or down and may easily be stowed away.

15 Claims, 4 Drawing Sheets

CURTAIN SUPPORT ASSEMBLY WITH INTEGRATED STORAGE FACILITY IN A CABIN OF A VEHICLE

CROSS-REFERENCE TO RELATED APPLICATIONS

This application claims the benefit of the filing dates of U.S. Provisional Patent Application No. 61/072,470 filed Mar. 31, 2008, and German Patent Application No. DE 10 2008 016 420.8 filed Mar. 31, 2008, the disclosures of which are each hereby incorporated herein by reference.

The invention relates to a curtain support assembly in a cabin of a vehicle.

BACKGROUND OF THE INVENTION

Such assemblies, which are also known as curtain headers, are used, for example in an aircraft cabin, to accommodate a curtain rail while at the same time creating a blocking-out and/or light-proof separation device between the upper edge of a separation curtain that is guided in the curtain rail, and the cabin ceiling located above it. Normally the assembly comprises trim walls, also known as header panels, which on both sides cover up a space between the curtain rail and the cabin ceiling up to at least the upper edge of the curtain. The header panels often do not have any function beyond the one mentioned, so that the space arising between the header panels is wasted.

Furthermore, for the purpose of opening, usually the curtain that is guided in the curtain rail is laterally gathered and is attached, by means of press- or snap fasteners or magnetic closure devices, for example to a partition or some other installation components, so-called monuments, for example galleys or lavatories. This is disadvantageous because, for example, a gathered curtain remains permanently visible, protrudes in an undesirable way into the space and is not aesthetically pleasing. Furthermore, a gathered curtain has to be stowed away in such a manner that in the case of an evacuation an emergency exit is not obstructed. Moreover, a curtain may cover up functional parts that depend on visibility, for example monitors for the in-flight entertainment (IFE) system, so that the aircrew will time and again have to settle for compromise solutions when stowing away the curtain.

SUMMARY OF THE INVENTION

It may be the object of the invention to propose a curtain support assembly in which the curtain may be stowed away so that it does not protrude into the space, does not present an obstruction in the case of an evacuation, and in which the space that arises between the lateral header panels above a curtain rail contained in the assembly may be used efficiently.

This object may be met by an assembly to receive a curtain rail for a curtain for separating at least two regions in a cabin of a vehicle, comprising at least two header components for covering a space formed between the curtain rail and a ceiling in the cabin. A hollow space is formed between the header elements for the purpose of holding objects. The hollow space is accessible by way of one or several closable openings to the cabin. Advantageous improvements are also provided herein. Furthermore, the object may be met by the use of the assembly according to the invention and by an aircraft with the assembly according to the disclosure provided herein.

In contrast to the state of the art, in the assembly according to the invention it is proposed that the interior space between the trim components affixed above the curtain rails be used as a further stowage compartment. In this stowage compartment numerous items may be accommodated that, as exclusively as possible, may be used by members of the cabin crew. For example, this may include demo kits for demonstrating the procedure of fastening and undoing seatbelts, first-aid equipment, blankets and cushions, life vests as well as personal belongings and the like. When it provides such an additional stowage compartment, the assembly according to the invention comprises at least one flap which makes it possible to access the interior of the stowage compartment. In this arrangement, activation of the flap or of the flaps may, optionally, take place in a mechanical, electrical, pneumatic or hydraulic manner. Numerous variants of stowage compartments are imaginable, for example a stowage compartment with a flap on its underside, which flap may be operated in a scissor-like manner; a stowage compartment with a side flap that is operated in a hinged manner; a stowage compartment that may entirely or partly be hinged; and a stowage compartment according to the trap-door principle with flaps opening downwards.

Lastly, the arrangement according to the invention may also be used to roll up the curtain in the manner of the roller shutter principle. To this effect the curtain could be arranged on a type of roller or cylinder with an integrated curtain rail which when rotated on its longitudinal axis rolls the curtain up in an upwards movement. A variant of this exemplary embodiment is also designed according to the principle of a roller shutter, however, it is implemented by means of a roller shutter box that is arranged entirely above the cabin ceiling. Overall, this obviates the need for creating lateral trim components and thus a hollow space in the assembly according to the invention, because the assembly according to the invention disappears entirely above the cabin ceiling. This creates entirely new possibilities for implementing the interior design of the cabin, and creates a new feeling of spaciousness among passengers. The other variant of this exemplary embodiment also provides for the use of a roller or cylinder according to the roller-shutter principle for rolling up the curtain. It differs from the above-mentioned exemplary embodiment in that the location of the roller accommodation is different. As is the case with the header panel with a stowage compartment function, the interior space between the ceiling contour and the outlet aperture for the curtain, which interior space is delimited by side trim parts, is used as the place of storage of the roller or cylinder.

BRIEF DESCRIPTION OF THE DRAWINGS

Below, the invention is explained in more detail with reference to figures. Identical items have the same reference characters. The following are shown.

DETAILED DESCRIPTION

Figure 1:
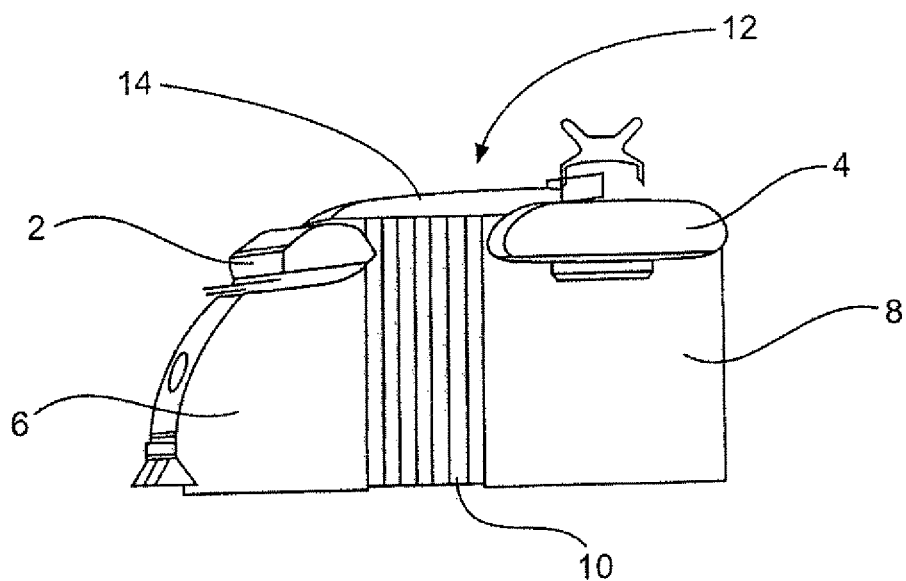
FIG. 1: an assembly for holding and providing a header for a curtain in an aircraft cabin from the state of the art.

The assembly for holding and providing a header for a curtain in an aircraft cabin is usually designed as shown in FIG. 1. On overhead bins, so-called hatracks 2 and 4, which are located laterally and in the centre of the cabin, partitions 6 and 8 are arranged, which essentially extend to the floor of the cabin. Between the two partitions 6 and 8 a curtain 10 extends, which is guided on an enclosed curtain rail (accommodated by a so-called header panel or curtain header 12, see above) and that is used to block the view along an aisle, between the partitions 6 and 8. This curtain header 12 is covered by lateral covering parts 14 that essentially extend from the upper edge of the curtain, or at least from the lower edge of the curtain rail upwards right to the cabin ceiling. In this way a separation device between different cabin regions, which comprise for example different classes, is provided.

Figure 2:
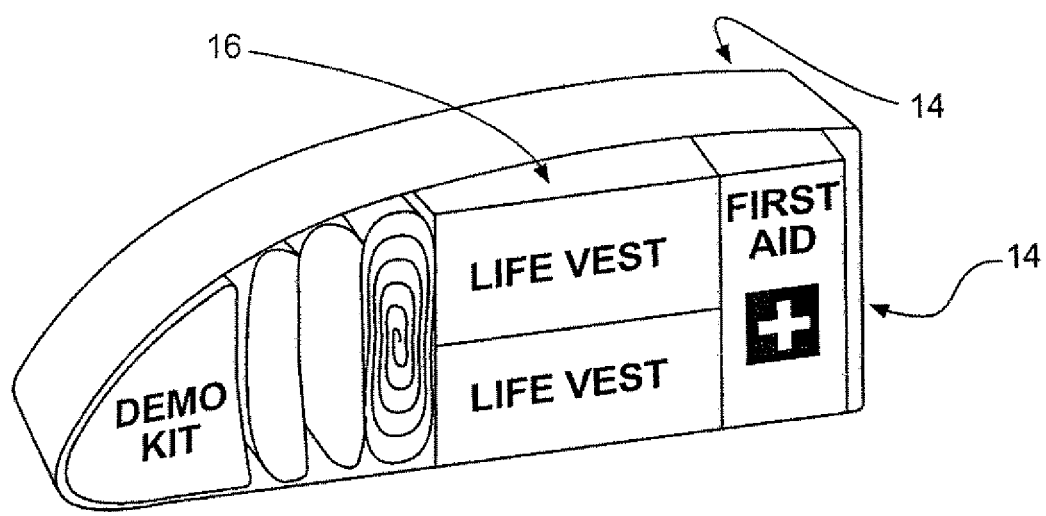
FIG. 2: a first exemplary embodiment of the assembly according to the invention.

FIG. 2 shows a first exemplary embodiment of the assembly according to the invention, in which embodiment a hollow space or stowage compartment 16 that forms between the two lateral covering parts 14 is made useable for stowing various objects. These may be objects of any desired type; however, due to the position of the assembly according to the invention, they should preferably be objects whose use is restricted to members of the cabin crew.

In order to open the hollow space 16 and to remove items or place items, for example the exemplary opening principles shown in FIGS. 3a to 3e may be applied. The principles shown should, however, not be interpreted as being limiting; they merely serve as examples.

Figure 3A:
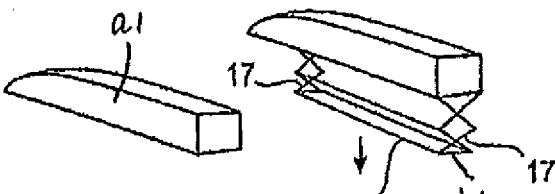
FIGS. 3a to 3e: modifications of the first exemplary embodiment of the assembly according to the invention.

FIG. 3a shows, for example, an assembly including header components a1 and b1, in which a flap 18 that is actuated by two scissor mechanisms 17 that are arranged laterally may be extended downwards in the direction of the cabin floor. Since the assembly according to the invention also comprises the curtain rail, the assembly according to the invention is divided in longitudinal direction of the cabin so that, when seen from the aisle, a front and rear stowage compartment arises, each of which comprises a flap that is actuated using a scissor system.

Figure 3B:
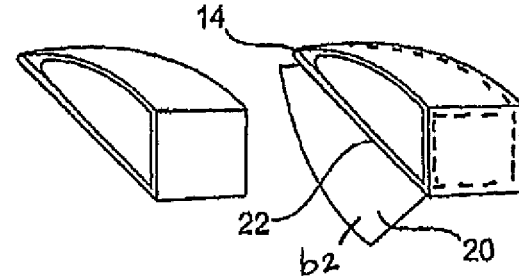

FIG. 3b shows a relatively simple method for opening the hollow space 16 to the cabin, in which the sidewall 14 of a side flap 20 is held so as to be hingable on two hinges 22. In the diagram the hinges 22 are situated, as an example, on the underside of the lateral covering 14; they make it possible to open the flap 20 in the direction towards the cabin floor. The lateral covering 14 and the sidewall 14 may constitute header components a2 and b2, respectively.

Figure 3C:
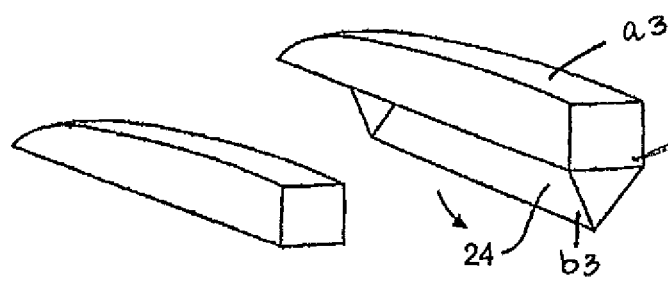

The arrangement shown in FIG. 3c comprises header components a3 and b3 and a separate interior compartment 24 that may be hinged open on a rotary axis 26, which, for example, extends parallel to the largest extension of the assembly according to the invention, and along an edge of the underside.

Figure 3D:
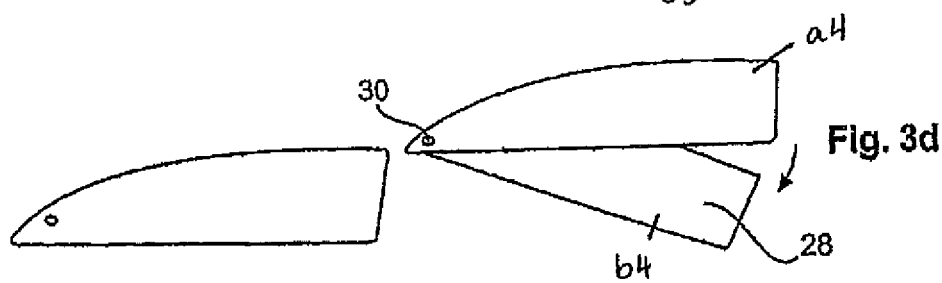

FIG. 3d shows a further embodiment of the arrangement according to the invention, which also comprises header components a4 and b4 and an interior compartment 28, which is, however, hingable on a rotary axis 30 that extends so as to be essentially perpendicular to the axis of rotation 26 of FIG. 3c and on a side of the assembly according to the invention, which side faces the cabin wall.

Figure 3E:
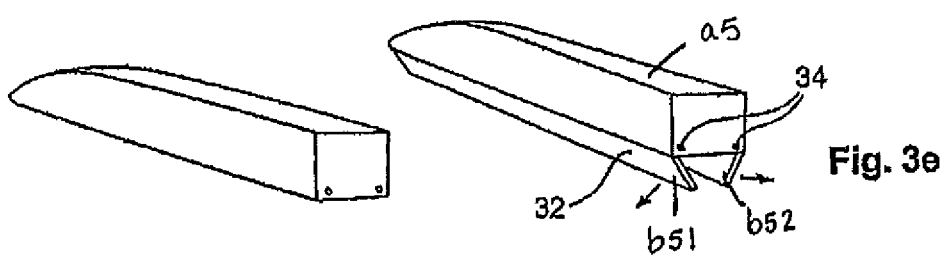

Finally, FIG. 3e shows a further opening principle, in which the assembly according to the invention comprises header components a5, b51 and b52, and a trapdoor 32 that may be hinged open on axes 34 that extend so as to be perpendicular to the longitudinal axis of the aircraft. As seen in FIGS. 3a-3e, the header components may have different shapes.

In the opening principles shown it should be noted that in particular in the case of flaps or interior surfaces that are hingable downwards towards the cabin floor, for the purpose of safeguarding against self-acting opening, corresponding catch-, snap- or lock mechanisms should be affixed to the assembly according to the invention.

Figure 4:
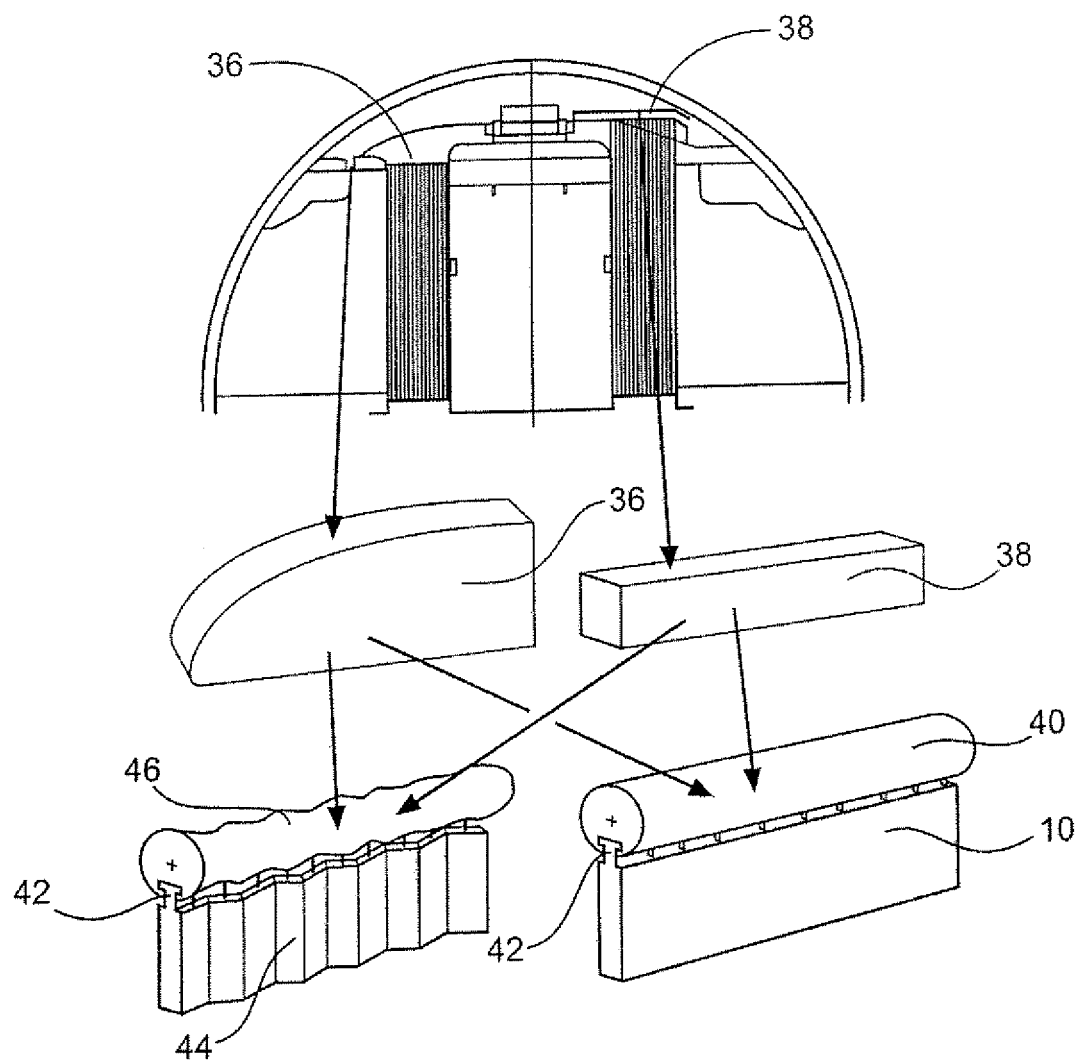
FIG. 4: a second exemplary embodiment of the assembly according to the invention.

In a modification of the presented exemplary embodiments of the arrangement according to the invention, the hollow space 16 between the header components 14 may also be used, entirely or in part, to stow away the curtain 10 by means of a type of roller-shutter principle within the hollow space 16. FIG. 4 shows that the curtain 10 could be stowed away in a curtain box 36 whose basic dimensions correspond to that of the hollow space 16. The principle could be modified by means of a curtain box that is arranged above the cabin ceiling like a roller-shutter box 38, from which the curtain 10 may come out and move into the cabin through an opening in the cabin ceiling. In both principles the curtain is rolled or unrolled onto or from a cylinder or roller 40 in which at the same time a curtain guide rail 42 is integrated. In this arrangement, driving the roller 40 may take place manually or automatically, for example by way of an electric motor. For reasons relating to the visual appearance, a channelled curtain 44, as shown in the left-hand side of FIG. 4, may be used in the cabin, which channelled curtain 44 does not, however, have any effect on the function of the principle shown. If a channelled curtain is used, there would, however, have to be a matching cylinder or roller, as shown by the roller 46 on the left-hand side of FIG. 4. The roller surface would then not be smooth, as is the case with the pendant 40 used for the smooth curtain 10, but instead, by its corrugated shape said roller surface conforms to the channels or pleats of the curtain 44.

The assembly according to the invention provides a great advantage in that additional stowage space is created without there being a reduction in the hitherto available space; emergency equipment (for example life vests for children, first aid equipment) may be stored so as to be easily accessible in a stowage compartment above the curtain of an aisle; existing hatracks etc. may be used elsewhere; and the usability of the cabin overall is improved.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 Overhead bin (hatrack)
4 Overhead bin (hatrack)
6 Partition
8 Partition
10 Curtain
12 Curtain header
14 Sidewall
16 Hollow space
18 Scissor-operated flap
20 Side flap
22 Hinges
24 Separate interior compartment
26 Axis of rotation
28 Interior compartment
30 Axis of rotation
32 Trapdoors
34 Hinging axes
36 Curtain box
38 Roller-shutter-box-like curtain box
40 Roller/cylinder for smooth curtain
42 Curtain rail
44 Curtain
46 Roller/cylinder for channelled curtain

The invention claimed is:

1. A curtain support assembly for a cabin of a vehicle, comprising:
a curtain rail having a curtain for separating at least two regions in a cabin of a vehicle; and
a plurality of header components for covering a space formed between the curtain rail and a ceiling in the cabin and for receiving the curtain rail,
wherein between the header components, a hollow space is formed that is accessible by way of one or more closable openings to the cabin and configured to hold at least one item for use by a person in the vehicle,
wherein, in the hollow space, the assembly comprises an interior stowage compartment hinged on a rotation axis substantially perpendicular to a length of the support assembly.

2. The assembly of claim 1, further comprising closing flaps, wherein the openings are closable by the closing flaps.

3. The assembly of claim 1, further comprising a roller for rolling and unrolling the curtain, the roller arranged in the stowage compartment.

4. The assembly of claim 3, wherein the roller comprises a serrated shape for receiving a correspondingly-formed curtain that comprises channels or pleats.

5. The assembly of claim 2, wherein the closing flaps are extendable in a scissor-like manner towards a cabin floor.

6. The assembly of claim 2, wherein the flaps are held by one or several hinges so as to be hingable.

7. The assembly of claim 2, further comprising a locking device for unlockably locking the flaps.

8. An aircraft comprising at least one cabin with a curtain support assembly, the curtain support assembly comprising:
a curtain rail having a curtain separating at least two regions in a cabin of a vehicle; and
a plurality of header components for covering a space formed between the curtain rail and a ceiling in the cabin and for receiving the curtain rail,
wherein between the header components, a hollow space is formed that is accessible by way of one or more closable openings to the cabin and configured to hold at least one item for use by a person in the vehicle,
in the hollow space, the assembly comprises an interior stowage compartment hinged on a rotation axis substantially perpendicular to a length of the support assembly.

9. The aircraft according to claim 8, wherein the curtain support assembly extends between two laterally distanced overhead stowage bins.

10. The assembly of claim 8, further comprising closing flaps, wherein the openings are closable by the closing flaps.

11. The assembly of claim 8, further comprising a roller for rolling and unrolling the curtain, the roller arranged in the stowage compartment.

12. The assembly of claim 11, wherein the roller comprises a serrated shape for receiving a correspondingly-formed curtain that comprises channels or pleats.

13. The assembly of claim 10, wherein the closing flaps are extendable in a scissor-like manner towards a cabin floor.

14. The assembly of claim 10, wherein the flaps are held by one or several hinges so as to be hingable.

15. The assembly of claim 10, further comprising a locking device for unlockably locking the flaps.

* * * * *